United States Patent
Liu et al.

(10) Patent No.: US 8,766,908 B2
(45) Date of Patent: Jul. 1, 2014

(54) TOUCH PANEL

(75) Inventors: Hsuan-Chen Liu, Kaohsiung (TW); Yi-Chung Juan, Yongkang (TW); Sung-Chun Lin, Tainan (TW); Wei-Chi Lin, Zhubei (TW)

(73) Assignee: Hannstar Display Corp., New Taipei (TW)

( * ) Notice: Subject to any disclaimer, the term of this patent is extended or adjusted under 35 U.S.C. 154(b) by 373 days.

(21) Appl. No.: 13/081,814

(22) Filed: Apr. 7, 2011

(65) Prior Publication Data

US 2011/0248943 A1   Oct. 13, 2011

(30) Foreign Application Priority Data

Apr. 9, 2010   (TW) ................. 99111033 A

(51) Int. Cl.
    G09G 3/36   (2006.01)
    G06K 11/06  (2006.01)

(52) U.S. Cl.
    USPC ............. 345/104; 178/18.06; 178/18.05; 345/173; 345/174

(58) Field of Classification Search
    CPC ............. G06F 2203/04103; G06F 3/045
    USPC ............. 345/104, 173, 174; 178/18.03, 178/18.05–18.07
    See application file for complete search history.

(56) References Cited

U.S. PATENT DOCUMENTS

| | | | |
|---|---|---|---|
| 2006/0102460 A1* | 5/2006 | Bourdelais et al. | 200/512 |
| 2009/0167703 A1* | 7/2009 | You et al. | 345/173 |
| 2009/0237369 A1* | 9/2009 | Hur et al. | 345/173 |
| 2010/0156827 A1* | 6/2010 | Joo et al. | 345/173 |

* cited by examiner

*Primary Examiner* — Lun-Yi Lao
*Assistant Examiner* — Ibrahim Khan
(74) *Attorney, Agent, or Firm* — McClure, Qualey & Rodack, LLP

(57) ABSTRACT

A touch panel is provided. The touch panel having a pixel area and a sensing area includes a first substrate and an opposite second substrate. A press sensing spacer is disposed on the sensing area of the first substrate. A press sensing stage is disposed on the sensing area of the second substrate, corresponding to the press sensing spacer. An alignment layer is disposed over the second substrate, covering the press sensing stage and the pixel area of the second substrate. In an embodiment, the height of the press sensing stage is greater than the height from the surface of the second substrate at the pixel area to the bottom of the alignment layer by at least 0.05 μm.

15 Claims, 7 Drawing Sheets

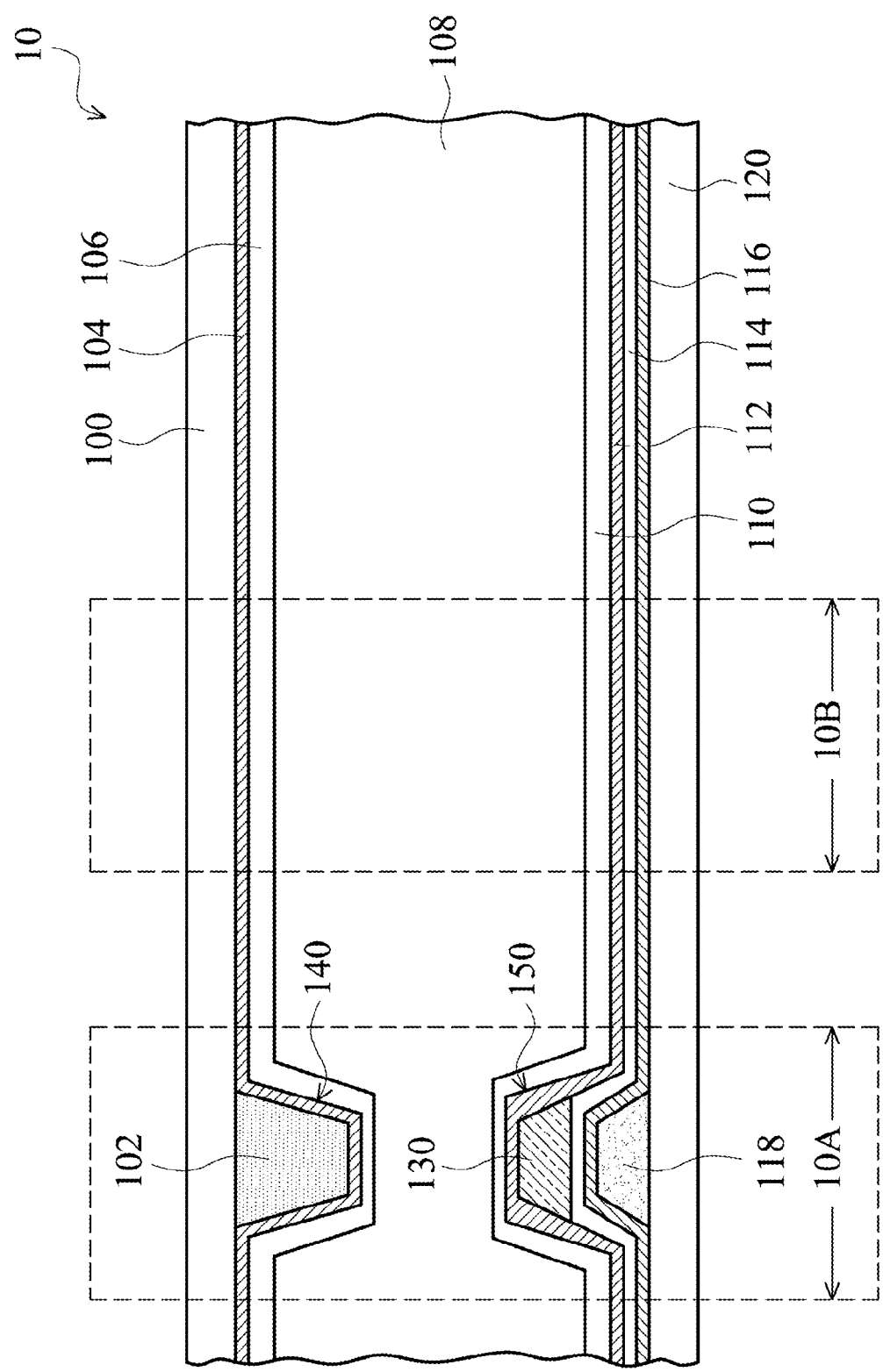

TOUCH PANEL

CROSS REFERENCE TO RELATED APPLICATIONS

This Application claims priority of Taiwan Patent Application No. 99111033, filed on Apr. 9, 2010, the entirety of which is incorporated by reference herein.

BACKGROUND OF THE INVENTION

1. Field of the Invention

The present invention relates to a touch panel, and in particular relates to a resistive in-cell touch panel with reduced active force.

2. Description of the Related Art

Conventional touch panels are generally resistive, capacitive or other types of touch panels, such as infrared ray or surface acoustic wave touch panels, which can achieve touch sensing effects. Of which, the resistive touch panels are popularly used for various electronic products due to its fabrication processes are simple and fabrication costs are low. Resistive touch panels monitor variations in voltages to determine touch positions.

Generally, touch panels are applied to the outside of display panels or in the inside of display panels. However, the additional touch panels decrease optical characteristics of display panels. Thus, touch panels are generally disposed in the inside of display panels as in-cell touch panels. Liquid crystal display panels need alignment layers of polyimide (PI) to sandwich a liquid crystal layer for arranging of the liquid crystal molecules of the liquid crystal layer in order. However, touch sensing efficiency of the resistive in-cell touch panel are reduced due to the PI alignment layers, and thus active force for the touch panels are increased.

Therefore, a resistive in-cell touch panel which can overcome the above problems and reduce active force of the touch panels to improve touch sensing efficiency of the in-cell touch panels is desired.

BRIEF SUMMARY OF THE INVENTION

According to an illustrative embodiment, a touch panel having a pixel area and a sensing area is provided. The touch panel comprises a first substrate, and a press sensing spacer is disposed on the sensing area of the first substrate. A second substrate is disposed opposite to the first substrate and a press sensing stage is disposed on the sensing area of the second substrate, corresponding to the press sensing spacer. An alignment layer is disposed over the press sensing stage and a surface of the pixel area of the second substrate, wherein the press sensing stage has a first height, and a second height is defined from the surface of the pixel area of the second substrate to a bottom of the alignment layer, and wherein the first height is greater than the second height by at least 0.05 µm.

According to an illustrative embodiment, a touch panel having a pixel area and a sensing area is provided. The touch panel comprises a first substrate, and a press sensing spacer is disposed on the sensing area of the first substrate. An alignment layer is disposed over the press sensing spacer and a surface of the pixel area of the first substrate. A second substrate is disposed opposite to the first substrate. A press sensing stage is disposed on the sensing area of the second substrate, corresponding to the press sensing spacer, wherein the press sensing spacer has a first height, and a second height is defined from the surface of the pixel area of the first substrate to the alignment layer, and wherein the first height is greater than the second height by at least 0.5 µm.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 1-7 show illustrative cross sections of touch panels according to various embodiments of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In embodiments of the invention, touch panels are provided. The touch panels can reduce the thicknesses of PI alignment layers over press sensing structures by the design of the press sensing structures. Thus, contact resistances of resistive touch panels are reduced and active forces for the resistive touch panels are also reduced to improve touch sensing efficiency of the touch panels.

Figure 1:
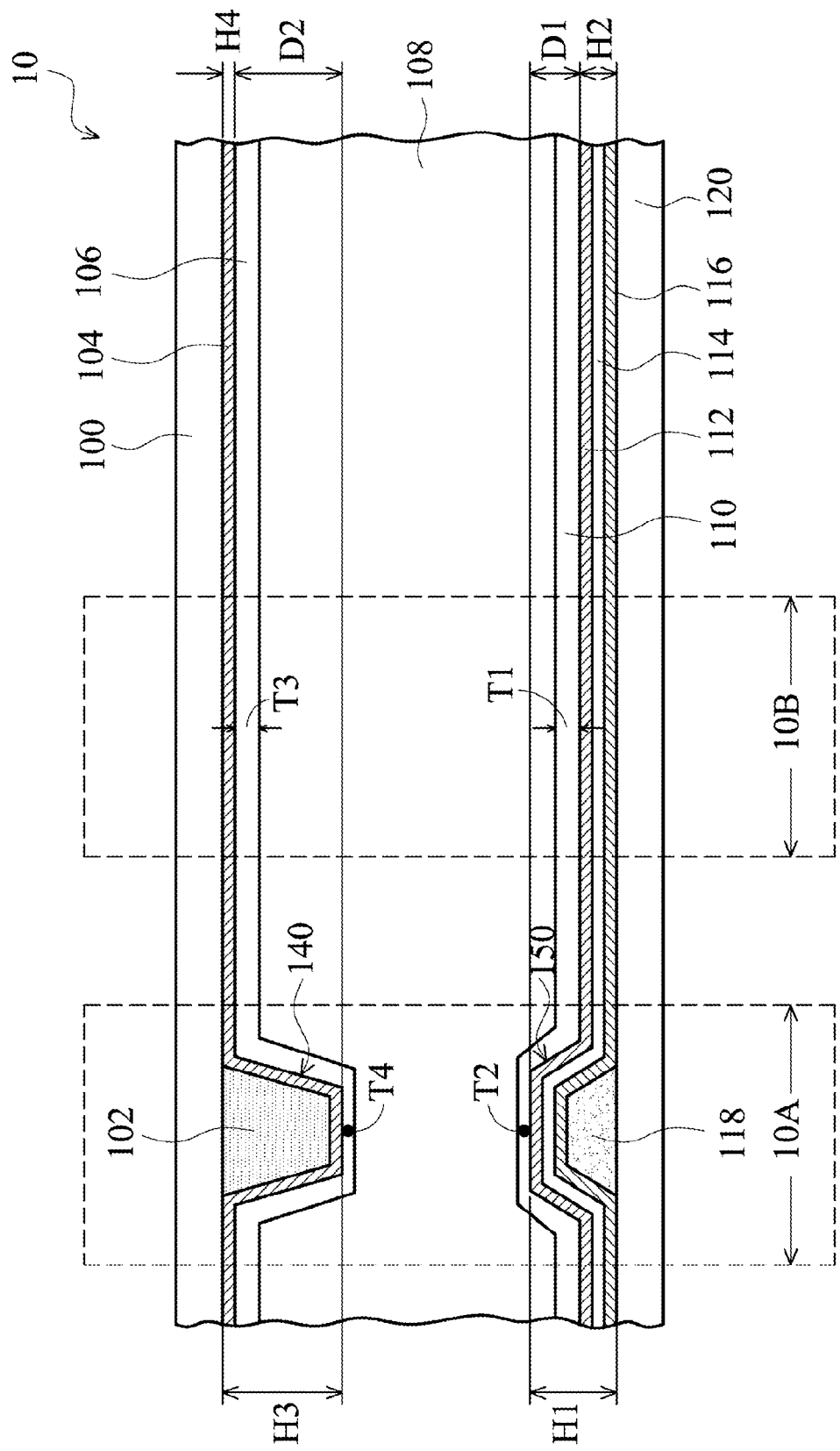

Referring to FIG. 1, a cross section of a touch panel 10 according to an embodiment of the invention is shown. The touch panel 10 has a sensing area 10A and a pixel area 10B. The touch panel 10 includes a first substrate 100, for example a color filter substrate, which has a black matrix (BM) layer (not shown) and a color filter (CF) layer (not shown) formed thereon. A press sensing spacer 140 is formed on the sensing area 10A of the first substrate 100. The press sensing spacer 140 can be formed of a photosensitive spacer 102 and a conductive layer 104 overlying the photosensitive spacer 102. The conductive layer 104 may be a transparent conductive layer, such as an indium tin oxide (ITO) layer or an indium zinc oxide (IZO) layer, which can be formed by a deposition process and a lithography process. The photosensitive spacer 102 can be formed by a photo resist coating process and a lithography process.

In addition, the touch panel 10 further includes a second substrate 120 disposed opposite to the first substrate 100. The second substrate 120 is for example a thin-film transistor (TFT) array substrate, having a plurality of TFTs (not shown) formed thereon. A press sensing stage 150 is formed on the sensing area 10A of the second substrate 120, corresponding to the press sensing spacer 140. When the touch panel is pressed, the press sensing spacer 140 is in contact with the press sensing stage 150 to produce a variation in voltage at the pressed position. The press sensing stage 150 is coupled to a readout TFT (not shown) on the second substrate 120, such that the voltage variations produced by the press sensing spacer 140 and the press sensing stage 150 contacting with each other can be monitored by the readout TFT to determine the press touch positions.

In an embodiment of the invention, the touch panel 10 can be an in-cell touch panel, in which the first substrate 100 and the second substrate 120 can sandwich a liquid crystal layer 108 for a display element. In order to regularly arrange the liquid crystal molecules in the liquid crystal layer 108, the touch panel 10 needs an upper alignment layer 106 and a lower alignment layer 110 to be formed therein to sandwich the liquid crystal layer 108. The upper alignment layer 106 and the lower alignment layer 110 are generally made of polyimide (PI), which can be formed by a relief printing plate (APR plate) printing method. Generally, the upper alignment layer 106 and the lower alignment layer 110 respectively have a thickness of about 1100 Å to 400 Å; thus the contact resistance of the press sensing spacer 140 and the press sensing stage 150 is increased, which increases the active force (AF) needs for the touch panel. Further, the touch sensing efficiency of the touch panel is reduced.

Therefore, according to an embodiment, a height H1 of the press sensing stage 150 is designed to be greater than a height H2, which is calculated from a surface of the pixel area 10B of the second substrate 120 to the bottom of the lower alignment layer 110, by an amount of at least 0.05 μm. In other words, the difference D1 between the height H1 and the height H2 is greater than or equal to 0.05 μm. With the surface of the second substrate 120 as a base, the height H1 of the press sensing stage 150 on the sensing area 10A is greater than the height H2 of stack layers 112, 114 and 116 on the pixel area 10B of at least 0.05 μm. Accordingly, when the lower alignment layer 110 is formed over the second substrate 120 by an APR plate printing method, a thickness T2 of the lower alignment layer 110 formed on the press sensing stage 150 is thinner than a thickness T1 of the lower alignment layer 110 formed on the pixel area 10B. In an embodiment, the thickness T2 of the lower alignment layer 110 is about 5% to 50% that of the thickness T1 of the lower alignment layer 110. Therefore, according to an embodiment of the invention, the thinner alignment layer formed on the press sensing stage can reduce the contact resistance of the press sensing spacer 140 and the press sensing stage 150, and further reduce the active force for the touch panel to improve touch sensing efficiency of the touch panel.

As shown in FIG. 1, in an embodiment, the press sensing stage 150 may be formed of a first metal layer 118, a gate insulating layer 116, a passivation layer 114 and a conductive layer 112. First, a patterned first metal layer 118 is formed on the sensing area 10A of the second substrate 120. The first metal layer 118 has a thickness of about 0.2 μm to about 0.3 μm. The material of the first metal layer 118 is for example Au, Ag, Cu, Al, Ti, Mo or AlNd alloy. Next, the gate insulating layer 116, the passivation layer 114 and the conductive layer 112 are formed on the sensing area 10A and the pixel area 10B of the second substrate 120 in sequence. The gate insulating layer 116 has a thickness of about 0.2 μm to about 0.35 μm. The material of the gate insulating layer 116 may be silicon nitrides, silicon oxides or silicon oxynitrides. The passivation layer 114 has a thickness of about 0.2 μm to about 0.3 μm. The material of the passivation layer 114 is for example an organic material or an inorganic material. The conductive layer 112 has a thickness of about 0.05 μm to about 0.08 μm. The material of the conductive layer 112 may be ITO, IZO or other suitable conductive materials. As shown in an embodiment of FIG. 1, the difference D1 between the height H1 of the press sensing stage 150 and the height H2 of the stack layers on the pixel area 10B is about 0.2 μm to about 0.3 μm. As shown in an embodiment of FIG. 1, the height H1 of the press sensing stage 150 containing the first metal layer 118 is about 0.74 μm. The thickness T2 of the lower alignment layer 110 formed on the press sensing stage 150 is about 556 Å. The thickness T1 of the lower alignment layer 110 formed on the pixel area 10B of the second substrate 120 is about 1106 Å. The thickness T2 is about 50% of the thickness T1. In this embodiment, the active force required for the touch panel 10 is about 600 g.

In another embodiment, a height H3 of the press sensing spacer 140 is greater than a height H4 of stack layers 104 on the pixel area 10B of the first substrate 100 by at least 0.5 μm through the design for the height of the press sensing spacer 140. In other words, the difference D2 between the height H3 and the height H4 is greater than or equal to 0.5 μm. With the surface of the first substrate 100 as a base, the height H3 of the press sensing spacer 140 on the sensing area 10A is greater than the height H4 of the stack layers 104 on the pixel area 10B by at least 0.5 μm. Accordingly, when the upper alignment layer 106 is formed over the first substrate 100 by an APR plate printing method, a thickness T4 of the upper alignment layer 106 formed on the press sensing spacer 140 is thinner than a thickness T3 of the upper alignment layer 106 formed on the pixel area 10B. In an embodiment, the thickness T4 of the upper alignment layer 106 may be about 5% to 50% that of the thickness T3 of the upper alignment layer 106. Therefore, according to an embodiment of the invention, the thinner alignment layer formed on the press sensing spacer 140 can reduce the contact resistance of the press sensing spacer 140 and the press sensing stage 150, and further reduce the active force required for the touch panel to improve touch sensing efficiency of the touch panel.

Figure 2:
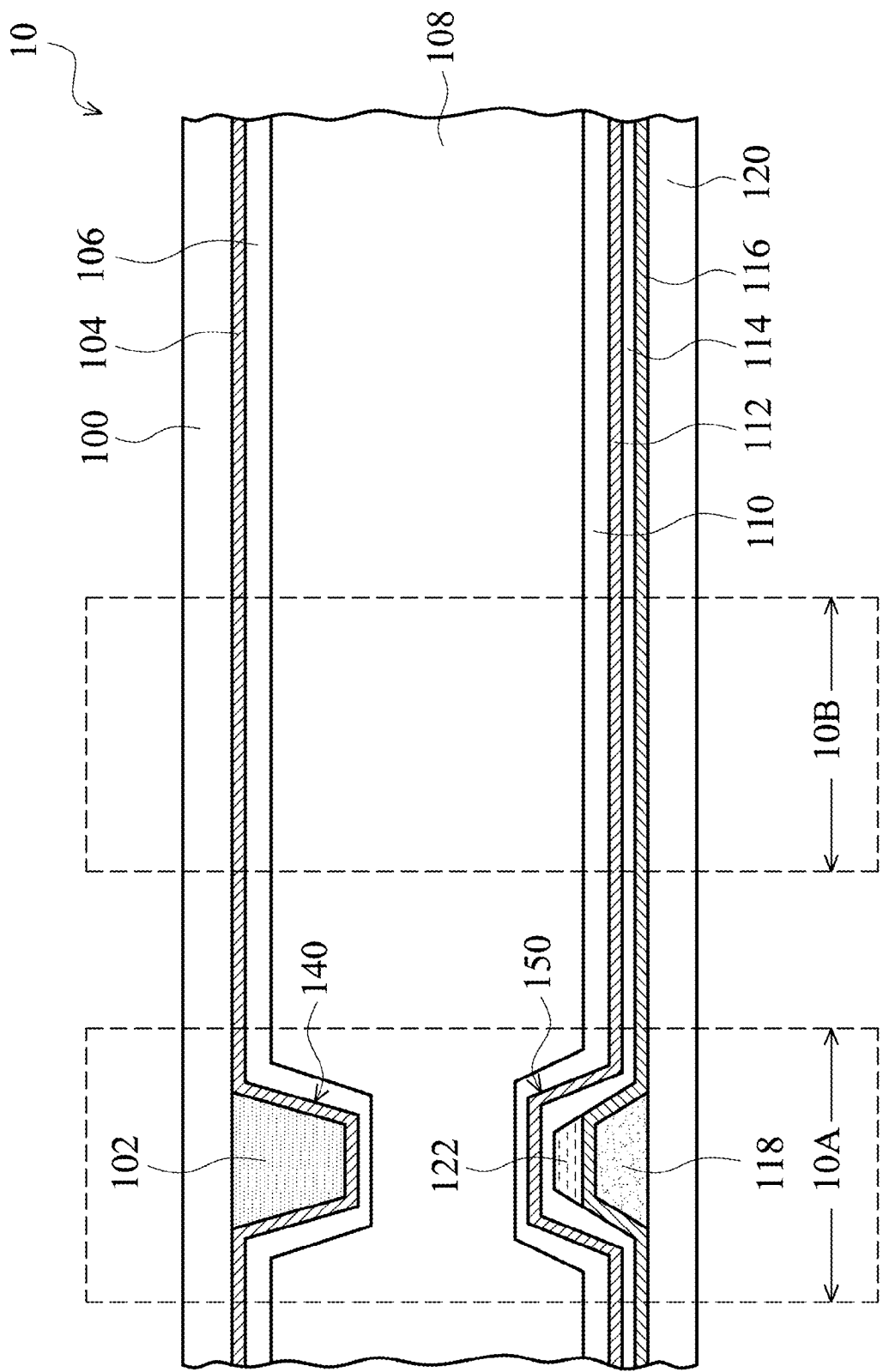

Next, referring to FIGS. 2-7, several cross sections of touch panels according to various embodiments of the invention are shown. The differences between the touch panel of FIG. 1 and the touch panels of FIGS. 2-7 are the structures of the press sensing stages 150. As shown in FIG. 2, the press sensing stage 150 can be formed of a first metal layer 118, a gate insulating layer 116, a polysilicon layer 122, a passivation layer 114 and a conductive layer 112. The thickness and the material of each layer of the press sensing stage 150 of FIG. 2 can be the same as that of the embodiment of FIG. 1 except for the polysilicon layer 122. In this embodiment, after formation of the gate insulating layer 116, a patterned polysilicon layer 122 is formed on the sensing area 10A of the second substrate 120. Thus, the height of the press sensing stage 150 is increased to form a thinner alignment layer on the press sensing stage 150. Thus, contact resistance of the press sensing spacer 140 and the press sensing stage 150, and active force required for the touch panel are reduced, and touch sensing efficiency of the touch panel is enhanced. In this embodiment, the polysilicon layer 122 has a thickness of about 0.12 μm to about 0.25 μm. The difference D1 between the height H1 of the press sensing stage 150 and the height H2 of the stack layers 112, 114 and 116 on the pixel area 10B of the second substrate 120 is about 0.32 μm to about 0.55 μm.

Figure 3:
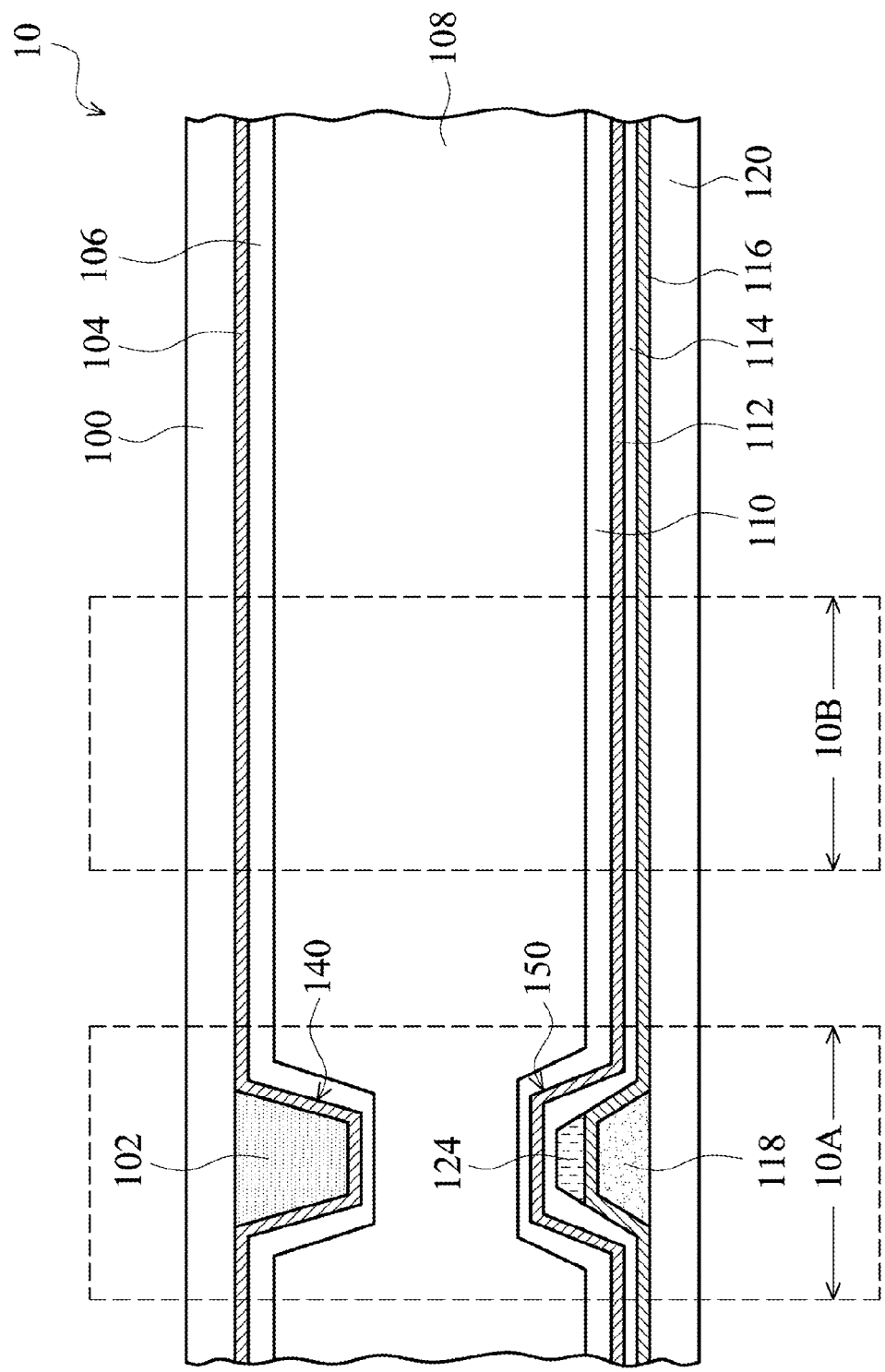

Next, referring to FIG. 3, in which, the press sensing stage 150 can be formed of a first metal layer 118, a gate insulating layer 116, a second metal layer 124, a passivation layer 114 and a conductive layer 112. The thickness and the material of each layer of the press sensing stage 150 of FIG. 3 can be the same as that of the embodiment of FIG. 1 except for the second metal layer 124. In this embodiment, after formation of the gate insulating layer 116, a patterned second metal layer 124 is formed on the sensing area 10A of the second substrate 120. Thus, the height of the press sensing stage 150 is increased to form a thinner alignment layer on the press sensing stage 150. Thus, contact resistance of the press sensing spacer 140 and the press sensing stage 150, and active force required for the touch panel are reduced, and touch sensing efficiency of the touch panel is enhanced. In this embodiment, the second metal layer 124 has a thickness of about 0.25 μm to about 0.35 μm. The material of the second metal layer 124 is such as Au, Ag, Cu, Al, Ti, Mo or AlNd alloy. The material of the second metal layer 124 may be the same as or different than that of the first metal layer 118. In this embodiment, the difference D1 between the height H1 of the press sensing stage 150 and the height H2 of the stack layers 112, 114 and 116 on the pixel area 10B of the second substrate 120 is about 0.45 µm to about 0.65 µm.

Figure 4:
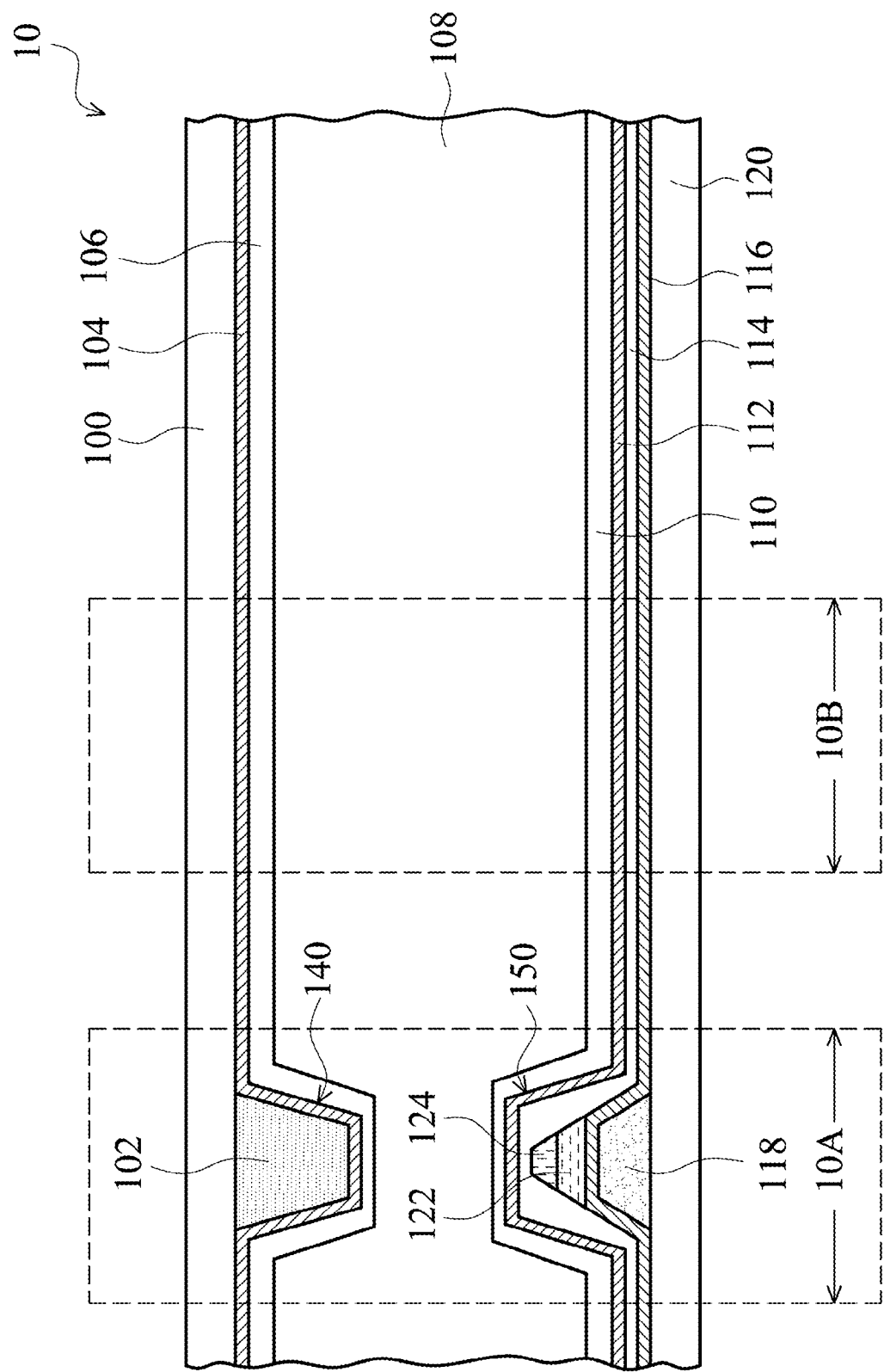

Referring to FIG. 4, in which, the press sensing stage 150 can be formed of a first metal layer 118, a gate insulating layer 116, a polysilicon layer 122, a second metal layer 124, a passivation layer 114 and a conductive layer 112. The thickness and the material of each layer of the press sensing stage 150 of FIG. 4 can be the same as that of the embodiment of FIG. 1 except for the polysilicon layer 122 and the second metal layer 124. In this embodiment, after formation of the gate insulating layer 116, a patterned polysilicon layer 122 and a patterned second metal layer 124 are formed on the sensing area 10A of the second substrate 120 in sequence. The height of the press sensing stage 150 can be increased to form a thinner alignment layer on the press sensing stage 150. Thus, contact resistance of the press sensing spacer 140 and the press sensing stage 150, and active force required for the touch panel are reduced, and touch sensing efficiency of the touch panel is enhanced. In this embodiment, the polysilicon layer 122 has a thickness of about 0.12 µm to about 0.25 µm. The second metal layer 124 has a thickness of about 0.25 µm to about 0.35 µm. The material of the second metal layer 124 is such as Au, Ag or Cu. The material of the second metal layer 124 may be the same as or different than that of the first metal layer 118. In an embodiment, the difference D1 between the height H1 of the press sensing stage 150 and the height H2 of the stack layers 112, 114 and 116 on the pixel area 10B of the second substrate 120 is about 0.57 µm to about 0.9 µm.

As shown in an embodiment of FIG. 4, the height H1 of the press sensing stage 150 containing the first metal layer 118, the polysilicon layer 122 and the second metal layer 124 is about 1.18 µm. The thickness T2 of the lower alignment layer 110 formed on the press sensing stage 150 is about 265 Å. The thickness T1 of the lower alignment layer 110 formed on the pixel area 10B of the second substrate 120 is about 1106 Å. The thickness T2 of the lower alignment layer 110 on the sensing area 10A is about 24% of the thickness T1 of the lower alignment layer 110 on the pixel area 10B. In this embodiment, the active force required for the touch panel 10 is about 150 g. By comparing the embodiments of FIG. 4 and FIG. 1, it is shown that when reducing the thickness T2 of the lower alignment layer 110 on the sensing area 10A from 556 Å to 265 Å, the active force required for the touch panel 10 is reduced from 600 g to 150 g.

Figure 5:
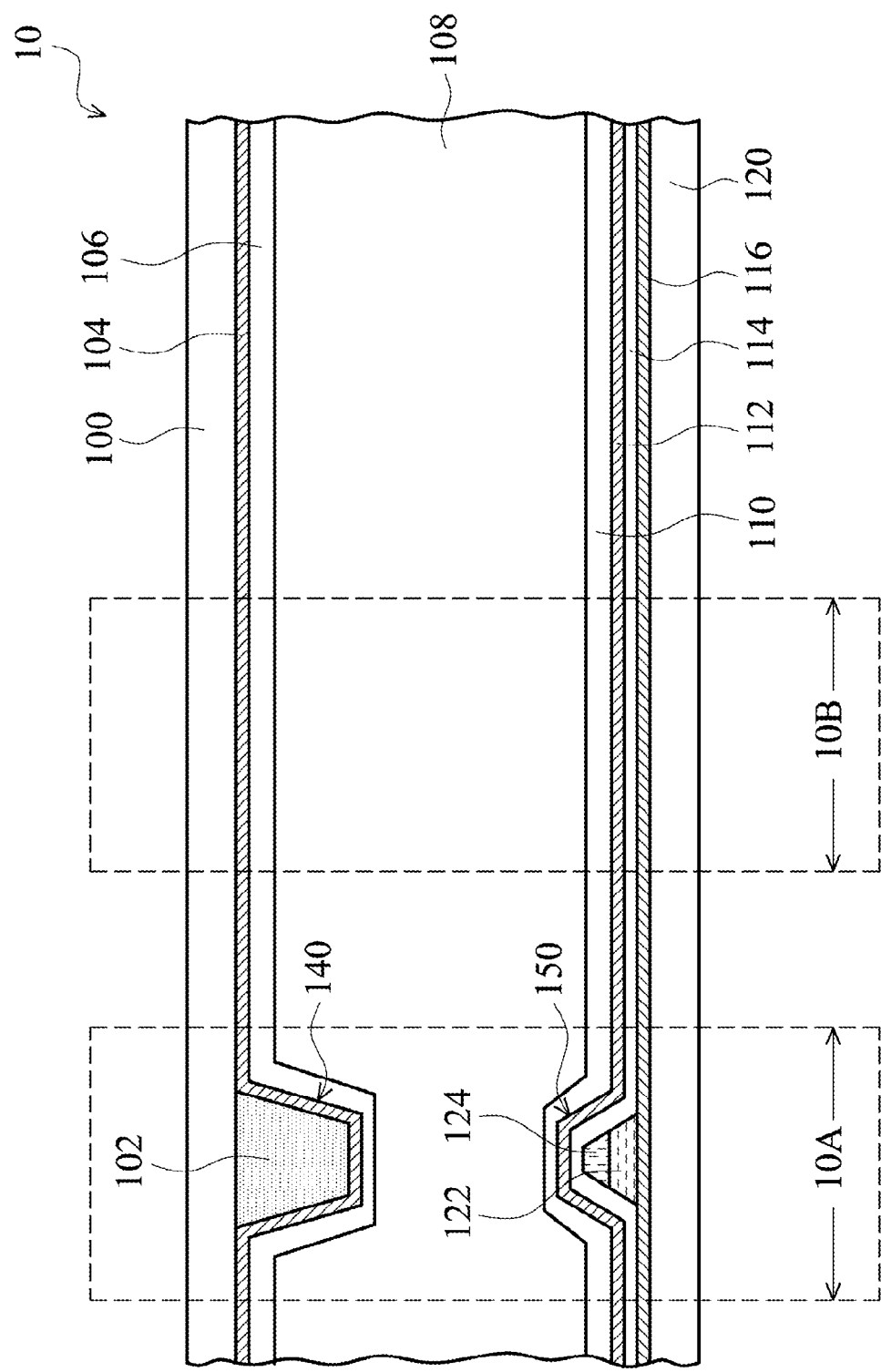

Next, referring to FIG. 5, in which, the press sensing stage 150 can be formed of a gate insulating layer 116, a polysilicon layer 122, a second metal layer 124, a passivation layer 114 and a conductive layer 112. The thickness and the material of each layer of the press sensing stage 150 of FIG. 5 can be the same as that of the embodiment of FIG. 4 except for the elimination of the first metal layer 118 from the press sensing stage 150 of FIG. 5 while compared with the press sensing stage 150 of FIG. 4. In this embodiment, the difference D1 between the height H1 of the press sensing stage 150 and the height H2 of the stack layers 112, 114 and 116 on the pixel area 10B of the second substrate 120 is about 0.37 µm to about 0.6 µm.

Figure 6:
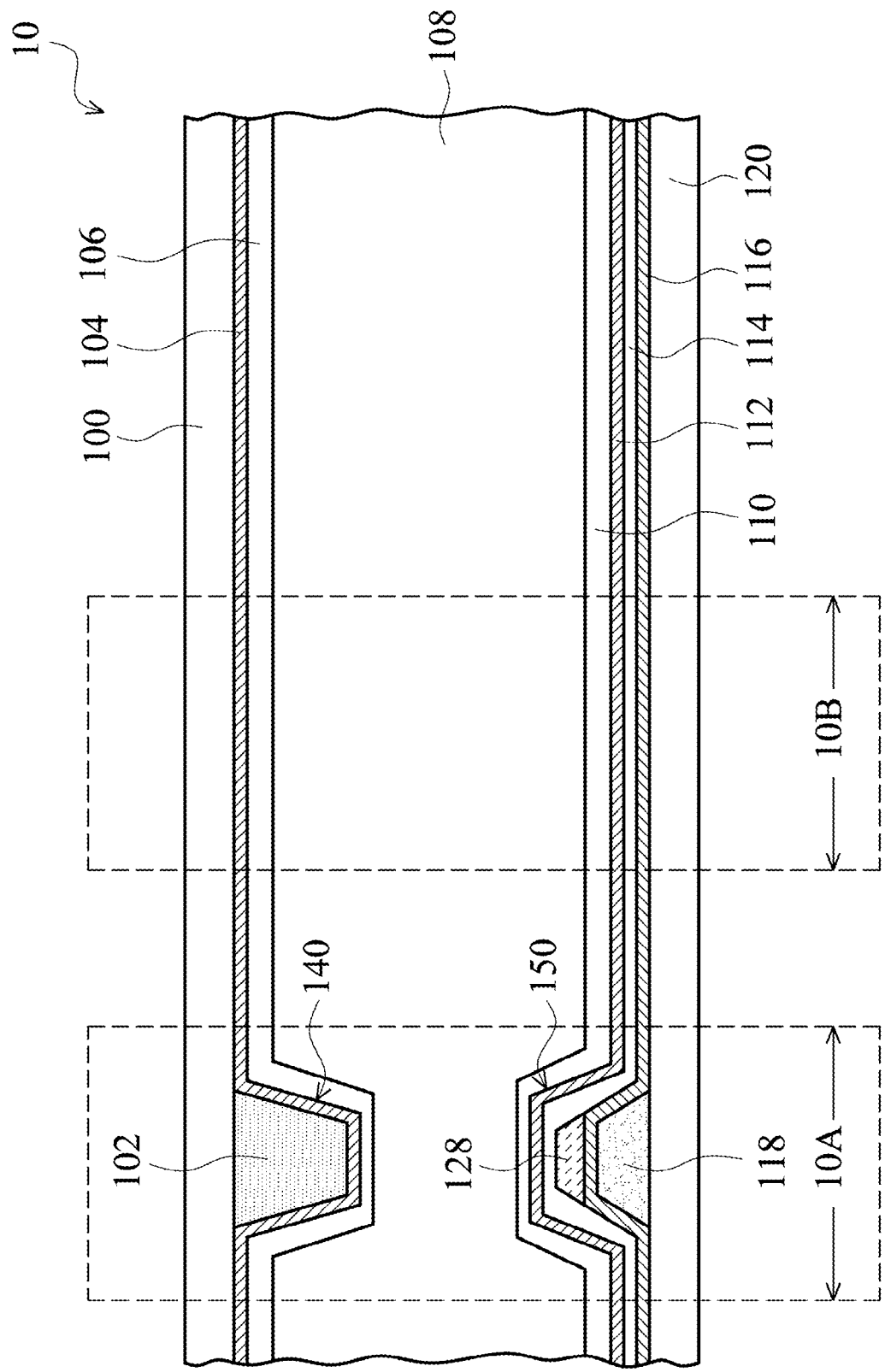

Then, referring to FIG. 6, in which, the press sensing stage 150 can be formed of a first metal layer 118, a gate insulating layer 116, a third metal layer 128, a passivation layer 114 and a conductive layer 112. The thickness and the material of each layer of the press sensing stage 150 of FIG. 6 can be the same as that of the embodiment of FIG. 1 except for the third metal layer 128. In this embodiment, after formation of the gate insulating layer 116, a patterned third metal layer 128 is formed on the sensing area 10A of the second substrate 120. The height of the press sensing stage 150 can be increased to form a thinner alignment layer on the press sensing stage 150. Thus, contact resistance of the press sensing spacer 140 and the press sensing stage 150, and active force required for the touch panel are reduced, and touch sensing efficiency of the touch panel is enhanced. In this embodiment, the third metal layer 128 has a thickness of about 0.2 µm to about 0.4 µm. The material of the third metal layer 128 is such as Au, Ag or Cu. The material of the third metal layer 128 may be the same as or different than that of the first metal layer 118. In an embodiment, the difference D1 between the height H1 of the press sensing stage 150 and the height H2 of the stack layers 112, 114 and 116 on the pixel area 10B of the second substrate 120 is about 0.4 µm to about 0.7 µm.

Referring to FIG. 7, in which, the press sensing stage 150 can be formed of a first metal layer 118, a gate insulating layer 116, a passivation layer 114, a protection coating layer 130 and a conductive layer 112. The thickness and the material of each layer of the press sensing stage 150 of FIG. 7 can be the same as that of the embodiment of FIG. 1 except for the protection coating layer 130. In this embodiment, after formation of the passivation layer 114, a patterned protection coating layer 130 is formed on the sensing area 10A of the second substrate 120. The height of the press sensing stage 150 can be increased to form a thinner alignment layer on the press sensing stage 150. Thus, contact resistance of the press sensing spacer 140 and the press sensing stage 150, and active force required for the touch panel are reduced, and touch sensing efficiency of the touch panel is enhanced. In this embodiment, the protection coating layer 130 may have a thickness of about 1.0 µm to about 2.5 µm. The material of the protection coating layer 130 is for example acrylic resin, silicon nitrides, silicon oxides, silicon oxynitrides, etc. In this embodiment, the difference D1 between the height H1 of the press sensing stage 150 and the height H2 of the stack layers 112, 114 and 116 on the pixel area 10B of the second substrate 120 is about 1.2 µm to about 2.8 µm.

While the invention has been described by the embodiments to illustrate the structure of the press sensing stage 150 in the touch panel 10, it is to be understood that the invention is not limited to the disclosed embodiments. The press sensing stage 150 may further include other metal layers or other dielectric layers, or comprise other inorganic or organic pads to increase the height of the press sensing stage 150 and make the difference D1 between the height H1 of the press sensing stage 150 and the height H2 of the stack layers 112, 114 and 116 on the pixel area 10B of the second substrate 120 be greater than or equal to 0.05 µm.

Moreover, in the above mentioned embodiments, a transparent conductive layer 112 is disposed on the top layer of the press sensing stage 150. However, in other embodiments, as long as the portion of the press sensing stage 150 in contact with the lower alignment layer 110 is a layer with electrical conductive ability, the conductive layer 112 of the press sensing stage 150 can be removed. As long as the condition wherein the difference D1 between the height H1 of the press sensing stage 150 and the height H2 of the stack layers on the pixel area 10B of the second substrate 120 is greater than or equal to 0.05 µm.

In summary, the touch panels of the invention utilize the increase in the height of the press sensing stage and/or the height of the press sensing spacer of the press sensing structure to reduce the thickness of the alignment layer on the press sensing structure. Thus, contact resistance of the press sensing structure, and active force required for the touch panel are reduced, and touch sensing efficiency of the touch panel is enhanced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch panel, having a pixel area and a sensing area, comprising:
    a first substrate;
    a press sensing spacer disposed on the sensing area of the first substrate;
    a second substrate disposed opposite to the first substrate;
    a press sensing stage disposed on the sensing area of the second substrate, corresponding to the press sensing spacer; and
    a first alignment layer disposed over the press sensing stage and a surface of the pixel area of the second substrate,
    wherein the press sensing stage has a first height, and a second height is defined from the surface of the pixel area of the second substrate to a bottom of the first alignment layer, and wherein the first height is greater than the second height by at least 0.05 µm, and the press sensing stage comprises at least one metal layer, at least one dielectric layer, a conductive layer and a protection coating layer, wherein the dielectric layer is disposed between the metal layer and the conductive layer, the protection coating layer is disposed between the conductive layer and the dielectric layer, and the protection coating layer is only located directly below the press sensing spacer.

2. The touch panel of claim 1, wherein the first alignment layer over the press sensing stage has a first thickness, and the first alignment layer over the pixel area of the second substrate has a second thickness, and wherein the first thickness is less than the second thickness.

3. The touch panel of claim 2, wherein the first thickness is 5% to 50% that of the second thickness.

4. The touch panel of claim 1, wherein the conductive layer of the press sensing stage is nearer to the first alignment layer than the dielectric layer.

5. The touch panel of claim 4, wherein the conductive layer is a transparent conductive layer disposed under the first alignment layer and adjacent to the first alignment layer.

6. The touch panel of claim 1, wherein the dielectric layer of the press sensing stage is nearer to the first alignment layer than the metal layer.

7. The touch panel of claim 6, wherein the conductive layer is a transparent conductive layer disposed under the first alignment layer and adjacent to the first alignment layer.

8. The touch panel of claim 1, further comprising a thin-film transistor disposed on the second substrate and electrically connected to the press sensing stage for reading a press sensing signal.

9. The touch panel of claim 1, wherein the first substrate comprises a color filter substrate and the second substrate comprises a thin-film transistor array substrate.

10. The touch panel of claim 1, wherein the press sensing spacer comprises a photosensitive spacer.

11. The touch panel of claim 10, wherein the press sensing spacer further comprises a transparent conductive layer covering the photosensitive spacer, and the transparent conductive layer faces the press sensing stage.

12. The touch panel of claim 1, further comprising:
    a second alignment layer disposed over the press sensing spacer and a surface of the pixel area of the first substrate,
    wherein the press sensing spacer has a third height, and a fourth height is defined from the surface of the pixel area of the first substrate to the second alignment layer, and wherein the third height is greater than the fourth height by at least 0.5 µm.

13. The touch panel of claim 12, wherein the second alignment layer over the press sensing spacer has a first thickness, and the second alignment layer over the pixel area of the first substrate has a second thickness, and wherein the first thickness is less than the second thickness.

14. The touch panel of claim 13, wherein the first thickness is 5% to 50% that of the second thickness.

15. The touch panel of claim 1, wherein the protection coating layer has a thickness of 1.0 µm-2.5 µm and the first height is greater than the second height by 1.2 µm-2.8 µm.

* * * * *